United States Patent [19]

Kerko et al.

[11] 4,018,965

[45] Apr. 19, 1977

[54] PHOTOCHROMIC SHEET GLASS COMPOSITIONS AND ARTICLES

[75] Inventors: David J. Kerko; Thomas P. Seward, III, both of Corning, N.Y.

[73] Assignee: Corning Glass Works, Corning, N.Y.

[22] Filed: Apr. 14, 1975

[21] Appl. No.: 567,925

[52] U.S. Cl. .............................. 428/410; 65/30 E; 65/DIG. 2; 106/53; 106/54; 106/47 Q; 106/DIG. 6; 350/160 P; 351/163; 428/913

[51] Int. Cl.$^2$ ................ B32B 17/00; C03C 21/00; C03C 3/26; G02C 7/02

[58] Field of Search ............ 106/DIG. 6, 54, 47 Q; 65/145, DIG. 2, 30 E; 252/300; 428/428, 410, 913; 350/160 P; 351/163

[56] References Cited

UNITED STATES PATENTS

| | | | |
|---|---|---|---|
| 3,197,296 | 7/1965 | Eppler | 106/54 |
| 3,208,860 | 9/1965 | Armistead | 106/54 |
| 3,269,847 | 8/1966 | Cohen | 65/DIG. 2 |
| 3,338,696 | 8/1967 | Dockerty | 65/145 |
| 3,449,103 | 6/1969 | Stookey | 65/33 |
| 3,540,793 | 11/1970 | Araujo | 65/DIG. 2 |
| 3,653,863 | 4/1972 | Araujo | 65/30 |
| 3,663,193 | 5/1972 | Wilson | 65/DIG. 2 |
| 3,682,609 | 8/1972 | Dockerty | 65/83 |
| 3,734,754 | 5/1973 | Randall | 65/DIG. 2 |

FOREIGN PATENTS OR APPLICATIONS 1,252,649  11/1971  United Kingdom ............ 65/DIG. 2

OTHER PUBLICATIONS

"Parameters of Chemical Strengthening and Impact Performance of Corning Code 8361 and Corning Code 8097 Lenses," *American Journal of Optometry*, vol. 50, No. 4, pp. 79–88, 1973.

*Primary Examiner*—Ellis P. Robinson
*Attorney, Agent, or Firm*—Kees van der Sterre; Clinton S. Janes, Jr.; Clarence R. Patty, Jr.

[57] ABSTRACT

Chemically-strengthenable silver halide-containing lithium boroaluminosilicate glass compositions having physical and chemical characteristics required for sheet drawing processes and exhibiting excellent photochromic properties after heat treatment, and also strengthened photochromic drawn sheet glass articles provided therefrom, are described.

9 Claims, No Drawings

PHOTOCHROMIC SHEET GLASS COMPOSITIONS AND ARTICLES

BACKGROUND OF THE INVENTION

The present invention is in the field of photochromic glass and specifically relates to photochromic glass compositions which are both chemically strengthenable and suitable for use in the manufacture of photochromic sheet glass by direct drawing from a melt.

The basic patent in the field of photochromic glass, U.S. Pat. No. 3,208,860 to Armistead and Stookey, discloses a broad range of silicate glass compositions exhibiting reversible phototropic properties. These glasses are rendered reversibly phototropic through the inclusion of specified quantities of silver halide in the glass composition, and through appropriate heat treatment of the glass after forming to cause the precipitation and growth of silver halide crystallites in the glass. These crystallites are small enough to be invisible, yet are darkenable under the action of light to reduce the light transmitting capabilities of the glass. Upon shielding from light, the crystallites fade to the colorless state, restoring the original light transmission characteristics of the glass. In photochromic glasses these darkening and fading cycles may be repeated indefinitely without fatigue.

A major use for photochromic glasses exhibiting reversible darkening under the action of visible light has been in the manufacture of photochromic ophthalmic lenses. U.S. Pat. No. 3,197,296 to Eppler and Stookey, for example, describes a family of refractive index-corrected silicate glasses comprising silver halides which are useful for prescription lenses. These glasses exhibit, in conventional 2 mm thicknesses, photochromic properties sufficiently developed for prescription ophthalmic applications, and have refractive index characteristics compatible with conventional lens grinding procedures.

Ophthalmic lens manufacture normally comprises the pressing of glass lens blanks of optical quality from a melt followed by grinding and polishing of the lens blanks to specified prescriptions. It will be appreciated that the manufacture of non-prescription photochromic glass lenses, e.g., sunglass lenses, in large quantity by processes requiring grinding and polishing is not only expensive but also wasteful of material. For these reasons it would be desirable to provide less costly means for producing photochromic glass sheet for lenses or other applications. It would be particularly desirable to provide means for producing such sheet in large quantities and in a surface and bulk quality sufficient for optical use. The sheet could then be inexpensively sagged to curvatures required for lenses, windshields, or other sheet glass configurations.

Minimum requirements of photochromic glass sheet for applications such as described would be high optical quality, good chemical durability, and high strength and good photochromic darkenability even in moderate thickness. If the sheet is to be suitable for lightweight sunglass lenses, it must also be chemically strengthenable in order to meet FDA requirements for eyeglass lens safety. Federal safety requirements cannot be routinely met in lightweight glass sheet of moderate thickness (1.3–1.7 millimeters) in the absence of tempering, or by utilizing air tempering processes.

One method of improving the darkenability of photochromic glasses for thin sheet applications is to increase the silver halide content thereof in the manner described by Stookey in U.S. Pat. No. 3,449,103. However, this expedient requires that the glass be rapidly quenched from the melt in order to avoid haze in the glass due to macroscopic silver halide crystal formation. Pressing and rolling are processes which provide relatively rapid quenching of the glass below silver halide crystallization temperatures; however, these processes do not normally provide glass articles or glass sheet of optical surface quality because of surface marking by the mold or roller surfaces utilized to quench the glass.

Drawing processes are known which comprise direct formation of glass sheet from a melt, and in most of these processes the glass sheet surfaces are not contacted by mold or roller surfaces until after the glass has cooled sufficiently to resist surface marking. The widely known sheet draw processes include the Colburn process, the Fourcault process, and the Pittsburgh Plate or Pennvernon process. These processes utilize rollers to draw the sheet up from a glass melt; but can provide glass of near-optical quality and without surface marks in thicknesses on the order of about 1.5 millimeters. The downdraw sheet-forming processes described in U.S. Pat. Nos. 3,338,696 and 3,682,609 to Dockerty are particularly suitable for providing thin, lightweight sheet of controlled uniform thickness and optical quality at relatively low viscosities. German Patentschift 2,125,232 describes attempts to provide photochromic glass of conventional composition utilizing forming methods of this type.

Unfortunately, these known sheet drawing processes do not provide the rapid quenching action of conventional pressing procedures, presenting an uncertainty regarding the feasibility of producing haze-free highly-darkenable silver halide photochromic glass therefrom.

Moreover, all of these processes involve holding substantial volumes of glass at rather low temperatures to obtain useful sheet forming viscosities in the $10^4$–$10^6$ poise range. These volumes of glass are also required to be in prolonged contact with the refractory metals or ceramics utilized as the means for forming the drawn sheet. Such processes impose severe constraints on glass composition because of the formidable liquidus and glass stability problems associated with the handling and processing of glass at relatively low temperatures and high viscosities.

These problems are further aggravated by the fact that the attainment of the required degree of strengthenability in silicate glasses of the normal type require the inclusion in the glass of some minimum quantities of exchangeable alkali ions. In the case of the photochromic glasses herein described, the presence of lithium oxide is required. Unfortunately, the presence of lithium has a detrimental effect on low temperature glass stability, particularly in the presence of refractory ceramic surfaces.

Therefore, in order to be useful for the manufacture of lightweight photochromic glass sheet of optical quality utilizing conventional drawing processes, a glass composition must exhibit specified chemical and physical properties in addition to the aforementioned properties of optical clarity, chemical durability, chemical strengthenability and good photochromic darkening in low or moderate thicknesses. In particular, the glass must exhibit high viscosity at the liquidus and excellent stability against devitrification at forming viscosities despite prolonged contact with refractory metal and ceramic materials presently available for use as forming means in sheet draw processes.

In terms of specific constraints relating to glass properties for these processes, a glass composition must exhibit a viscosity at its liquidus temperature of at least about $10^4$ and preferably about $10^5$ poises, and it must exhibit excellent long term stability against devitrification and interfacial crystallization in contact with refractory metals and ceramics such as platinum, mullite, sillimanite, and high density alumina-containing refractories used to contain or form molten glass. This stability must be maintained down to temperatures in the range corresponding to glass viscosities of $10^4$–$10^6$ poises, which are the viscosities at which the glass is normally formed.

In addition, the glass provided must be one which is chemically strengthenable to an unabraded modulus of rupture strength of at least 45,000 psi and a depth of compression layer of at least 3.5 mils utilizing known ion-exchange strengthening processes. This combination of properties is required to enable the glass to routinely meet Federal safety requirements. Finally, the photochromic properties of the glass must be such that the glass exhibits, in thickness not exceeding about 1.7 millimeters, a luminous transmittance in the darkened or activated state (darkened luminous transmittance) of not more than about 25%, and a fading rate such that the glass exhibits a faded luminous transmittance at least 1.5 times the darkened luminous transmittance in a 5-minute fading interval.

In addition, it is required for most sunglass applications that these darkening and fading characteristics be obtained in glasses exhibiting a luminous transmittance in the clear or unactivated state (clear luminous transmittance) of at least about 60%, typically in the range of about 60–92%.

SUMMARY OF THE INVENTION

We have now discovered a region of glass compositions which can be used in processes for forming drawn sheet, and which yet provides haze-free optical quality, good chemical durability, chemical strengthenability, and photochromic properties which are sufficiently developed to be useful in thin sheet form. Broadly, glass compositions in accordance with the present invention consist essentially, in weight percent on the oxide basis as calculated from the batch, of about 54–60% $SiO_2$, 7–15% $Al_2O_3$, 10–25% $B_2O_3$, 0.5–4.0% $Li_2O$, 3.5–15% $Na_2O$, 0–10% $K_2O$, 6–16% total of $Li_2O$ + $Na_2O$ + $K_2O$, 0–3.0% PbO, 0.1–1.0% Ag, 0.1–1.0% Cl, 0–3.0% Br, 0.008–0.12% CuO, and 0–2.5% F. The glass may optionally additionally contain colorant oxides selected in the indicated proportions from the group consisting of 0–1% total of transition metal oxide colorants and 0–5% total of rare earth oxide colorants.

Glasses provided from the above-described compositions exhibit viscosities of at least about $10^4$ poises at the liquidus temperature thereof, a liquidus-viscosity relationship which permits forming by direct sheet drawing from the melt.

Glasses of these compositions also exhibit long-term stability against devitrification in contact with platinum at temperatures corresponding to glass viscosities in the range of $10^4$–$10^6$ poises, and can thus be drawn from the melt at those viscosities using platinum or platinum-clad drawbars, downdraw pipes, or other sheet forming means to provide glass sheet of optical quality. By long term stability against devitrification is meant good resistance to surface crystal growth in contact with platinum at temperatures corresponding to glass viscosities in the $10^4$–$10^6$ poise range. The growth of a crystalline layer not exceeding 10 microns in thickness at a glass-platinum interface over a 30-day interval at these viscosities is deemed good resistance to crystal growth.

These glasses also have excellent chemical durability, meaning for the purpose of the present description that the glass exhibits no visible surface film formation following a 10-minute exposure to 10% aqueous HCl.

Glasses within the above-described composition region are chemically strengthenable to an unabraded modulus of rupture strength of about 45,000 psi with a depth of ion-exchanged layer of at least 3.5 mils as determined by conventional stress layer examination techniques utilizing, for example, a polarizing microscope with a Babinet compensator. These strength and compression layer characteristics are obtainable through conventional sodium-for-lithium salt bath ion-exchange processes at normal ion-exchange temperatures (300°–450° C.), the surface compression being generated by the substitution into the glass of larger sodium ions for smaller lithium ions. The recited physical properties permit glass sheet of 1.3–1.7 millimeters thickness to pass Government impact tests for eyeglass lens safety.

Finally, glasses within the above-described composition region typically provide an excellent combination of photochromic properties following heat treatment in accordance with conventional practice. These properties include, in glass sheet not exceeding about 1.7 millimeters in thickness, a darkened luminous transmittance not exceeding 25% and a fading rate such that the glass exhibits a faded luminous transmittance at least 1.5 times the darkened luminous transmittance after a 5-minute fading interval from the darkened state. For the purpose of the present description the luminous transmittance of the glass is the value Y defined in terms of the 1931 C.I.E. trichromatic colorimetric system, utilizing the light source Illuminant C. This colorimetric system and light source are described by A. C. Hardy in the *Handbook of Colorimetry*, Technology Press, M.I.T., Cambridge, Mass. (1936). Also for the purpose of this description, the darkened state may be obtained by exposure of the glass to direct, normally incident sunlight for 30 minutes, and the clear or unactivated state may be obtained by overnight (8 hour) fading of the glass in the absence of light.

Preferably, glass to be utilized for sunglass lens applications will additionally have a clear luminous transmittance of at least about 60%, and this value can readily be achieved in combination with the other required photochromic properties in the composition region hereinabove described. However, darker glasses having unactivated luminous transmittances of less than 60% can also be routinely obtained within the described composition region if maximum or near maximum concentrations of the prescribed colorants are employed.

Glasses of the above-described composition are utilized in accordance with the method of the invention which comprises an improved process for the manufacture of drawn photochromic glass sheet, wherein glass of the aforesaid composition is melted, adjusted in temperature to a viscosity of $10^4$–$10^6$ poises, and then drawn past refractory forming means at viscosities in the $10^4$–$10^6$ poise range to form potentially photochromic glass sheet. By potentially photochromic glass sheet is meant glass sheet comprising silver halides and activators such as copper oxide which can be rendered photochromic through an appropriate heat treatment subsequent to forming. The refractory forming means may be a submerged drawbar, an overflow downdraw forming trough, termed a fusion pipe, or other known forming means utilized for forming glass sheet by updraw or downdraw processes from molten glass.

Observance of the above-described composition and process limitations, together with the use of supplemental heat treatments and strengthening processes utilizing conventional time-temperature schedules, permits the production in accordance with the invention of chemically strengthened photochromic drawn sheet glass articles having the strength characteristics and photochromic properties above set forth. These properties are particularly useful, for example, in the production of thin, lightweight, photochromic eyeglass or sunglass lenses or similar high strength articles for optical applications.

DETAILED DESCRIPTION

Since the photochromic, chemical and physical properties provided in drawn sheet glass articles provided in accordance with the invention are complex functions of the oxide constituents of the glass composition, observance of the composition limitations above set forth is critical in order to obtain the combination of properties required.

As previously noted, the presence of controlled quantities of lithium oxide in the glass is required for achieving the specified modulus of rupture strength of 45,000 psi and depth of compression layer of 3.5 mils. The use of less than 0.5% of $Li_2O$ by weight produces glass which cannot be consistently strengthened to these values, while the use of more than 4% $Li_2O$ has detrimental effects on glass stability against platinum at $10^4$–$10^6$ poise viscosities, and can produce haze in the glass. The required strength and depth of layer values are not obtainable in the absence of lithia using, for example, a potassium-for-sodium ion exchange treatment to strengthen the glass.

Control over the concentration of the other alkali metals is required because of the effect thereof on glass strengthening and photochromic properties. If less than the specified levels of soda ad potash are used, strengthenability and photochromic darkenability are reduced. Excess total alkali content reduces the fading rate of the glass below the required levels, whereas excess potash detracts from the chemical strengthenability of the glass.

The presence of $Al_2O_3$ and $B_2O_3$ in the glass counters the effect of alkali on the fading rate; thus glasses containing less than the specified quantities of these constituents will exhibit inferior photochromic properties. However, the use of more than about 25% $B_2O_3$ by weight reduces the chemical durability of the glass below the required levels. The use of more than 15% alumina by weight substantially decreases glass stability against devitrification, with the excess alumina tending to combine with the lithium in tne composition to produce spodumene ($Li_2O \cdot Al_2O_3 \cdot 4SiO_2$) crystals.

The presence of lead oxide in some quantity is helpful to provide the required combination of photochromic properties in the glass.

The addition of minor quantities of unspecified constituents to the glass is permissible but is generally avoided because of the possibility of interfering with the required combination of properties. Thus while alkaline earth, bivalent and other multivalent metal oxides, such as BaO, CaO, SrO, MgO and ZnO can be present in very minor quantities, they offer no properties advantages and generally increases the liquidus and reduce the long-term stability of the glass. Minor amounts of the alkali metal oxides $Cs_2O$ and $Rb_2O$ may be present but tend to detract from the strengthenability of the composition.

Zirconia and titania should be specifically avoided due to their known tendency to nucleate spodumene crystallization. As little as 0.8% zirconia will promote zircon crystallization at temperatures in the forming range.

Polyvalent cations such as Sn, Sb and As may be added to the composition, for example, as minor quantities of $SnO_2$, $Sb_2O_3$, and $As_2O_3$. Such additions may be useful in modifying the characteristics of the glass melt, particularly in regard to oxidation state.

Glass compositions within the scope of the present invention may be compounded of conventional glass batch constituents in proportions which will yield the specified oxide constituents in the required amounts at temperatures utilized for melting the glass. Melting may be carried out in accordance with conventional optical glass melting practice in pots, tanks, crucibles, or other melting units at temperatures in the 1200°–1550° C. range.

Molten glass of the composition set forth may be formed by any conventional means such as pressing, rolling, blowing, spinning or the like. However, the glass is sufficiently stable that it may also be formed into sheet by direct drawing from the melt, at least where platinum or other refractory metal-based drawbars, downdraw troughs, or other forming means are utilized.

Glass sheet or other articles formed as described may then be heat treated in accordance with thermal schedules conventional for photochromic glasses in order to develop the specified photochromic properties therein. Suitable heat treatments comprise exposure of the glass sheet to temperatures in the range of 580°–750° C. for times ranging from a few seconds to 2 hours. To maintain the requires optical surface quality, the glass may be supported in a manner effective to prevent surface marking, e.g., by edge support means.

Finally, the phototochromic glass articles may be subjected to conventional chemical strengthening treatments in, for example, a molten sodium salt bath such as $NaNO_3$ or a mixed $NaNO_3/KNO_3$ bath containing 30% or more $NaNO_3$. The required strength and depth of compression layer may be obtained with these glasses by immersion in molten salt, for example, at temperatures of about 300°–450° C. for times of about 4–24 hours.

The best combination of photochromic and physical properties utilizing conventional heat treating and strengthening processes as above described are found with a preferred group of glasses having compositions consisting essentially, in weight percent on the oxide basis as calculated from the batch, of about 57.1–65.3% $SiO_2$, 9.6–13.9% $Al_2O_3$, 12.02–22.0% $B_2O_3$, 1.0–3.5% $Li_2O$, 3.7–12.0% $Na_2O$, 0–5.8% $K_2O$, 6–15% total of $Li_2O + Na_2O + K_2O$, a ratio of $Li_2O$ content to $Na_2O + K_2O$ content not exceeding about 2:3, 0.7–3.0% PbO, 0.1–1.0% Ag, 0.15–1.0% Cl, 0–3.0% Br, 0–2.5% F, 0.008–0.12% CuO, 0–1.0% total of transition metal oxides selected in the indicated proportions from the group consisting of 0–0.5% CoO, 0.1% NiO, and 0–0% $Cr_2O_3$, and 0–5.0% total of rare earth metal oxides selected from the group consisting of $Er_2O_3$, $Pr_2O_3$, $Ho_2O_3$, and $Nd_2O_3$.

Specific examples of preferred glass compositions meeting the above limitations are set forth in Table I below. The concentrations of constituents are set forth in parts by weight on the oxide basis as calculated from the glass batch, except that the halogens and silver are reported on an elemental basis in accordance with conventional practice.

All of the preferred glasses above described, including the examples of Table I below, have viscosities at the liquidus of at least $10^5$ poises, as well as excellent chemical durability characterized by stability in aqueous acidic solutions as hereinabove described. These glasses also exhibit long term stability against devitrification characterized by resistance to crystallization in contact with platinum at viscosities in the $10^4$–$10^6$ poise range, as above defined. When heat treated according to conventional schedules to develop photochromic properties, all glasses have darkened luminous transmittances not exceeding about 25% and fading characteristics such that the glasses exhibit a faded luminous transmittance at least 1.5 times the darkened luminous transmittance within a 5-minute fading interval. These glasses also exhibit clear luminous transmittances greater than 60%.

All of the preferred glasses are ion-exchange strengthenable to a modulus of rupture strength of at least 45,000 psi and a depth of compression layer at least 3.5 mils utilizing conventional ion-exchange strengthening treatments.

Table I includes photochromic property data where reported on individual samples, including the clear luminous transmittance of the glass ($Y_o$), the darkened luminous transmittance of the glass ($Y_D$), and the luminous transmittance of the darkened glass after a 5-minute fading interval ($Y_{F5}$). For purposes of reproducibility in measurement, the darkened glasses were all provided by exposure of the glass to two 15 watt black-light blue florescent UV lamp bulbs at a distance of 3¾ inches for a 20-minute interval, to approximately the darkening produced by exposure to direct sunlight as hereinabove described.

TABLE I

|  | 1 | 2 | 3 | 4 | 5 | 6 |
|---|---|---|---|---|---|---|
| $SiO_2$ | 59.5 | 59.5 | 59.5 | 58.1 | 60.9 | 57.1 |
| $B_2O_3$ | 17.3 | 17.0 | 17.7 | 17.3 | 15.8 | 17.0 |
| $Al_2O_3$ | 11.6 | 11.6 | 11.6 | 13.4 | 11.9 | 13.1 |
| $Na_2O$ | 5.8 | 7.6 | 5.8 | 5.6 | 5.9 | 7.6 |
| $Li_2O$ | 2.0 | 2.8 | 3.0 | 2.9 | 3.0 | 2.8 |
| $K_2O$ | — | — | — | — | — | — |
| PbO | 2.2 | 2.1 | 2.2 | 2.2 | 2.3 | 2.1 |
| F | .27 | .27 | .27 | .27 | — | .27 |
| Ag | .25 | .22 | .22 | .22 | .22 | .22 |
| Cl | .30 | .30 | .48 | .47 | .49 | .30 |
| Br | .25 | .20 | .15 | .48 | .11 | .35 |
| CuO | .018 | .018 | .018 | .018 | .026 | .018 |
| CoO | .14 | — | — | — | — | — |
| NiO | .13 | — | — | — | — | — |
| $Y_o$ | 74.7 | 91.1 | 90.8 | — | 91.8 | 91.6 |
| $Y_D$ | 22.0 | 21.0 | 22.0 | — | 22.7 | 21.9 |
| $Y_{F5}$ | 37.7 | 37.6 | 42.1 | — | 38.8 | 40.0 |

We have previously described the difficulties with respect to glass stability presented by the use of lithium oxide in the present glasses. Nevertheless, we have found that the presence of lithium oxide is required to achieve the required glass strengths and depths of compression layer, since a sodium-for-lithium ion-exchange process must be utilized to achieve these properties. Table II below illustrates glass compositions outside the scope of the present invention and shows the difficulties encountered when strengthening by a potassium-for-sodium ion exchange process is attempted. Compositions are set forth in parts by weight on the oxide basis as calculated from the batch, except for the halogens and silver which are reported on the conventional elemental basis.

The ion-exchange strengthening processes employed comprised immersion of the samples in molten $KNO_3$ salt baths at temperatures in the range of 300°–450° C. for times in the range of 2–24 hours in accordance with known procedures. It will be observed that none of the compositions shown in Table II was strengthenable to provide the combination of 45,000 psi strength and 3.5 mil depth of layer which is required to enable 1.3–1.7 millimeter glass sheet to routinely pass eyeglass impact safety requirements.

TABLE II

|  | A | B | C | D | E | F | G |
|---|---|---|---|---|---|---|---|
| $SiO_2$ | 63.1 | 58.3 | 69.9 | 56.8 | 60.6 | 60.6 | 58.0 |
| $B_2O_3$ | 17.9 | 22.1 | 10.0 | 21.5 | 17.4 | 18.5 | 18.9 |
| $Al_2O_3$ | 9.4 | 9.7 | 8.8 | 9.4 | 10.3 | 9.4 | 9.2 |
| $Na_2O$ | 9.6 | 9.9 | 4.6 | 4.9 | 6.3 | 10.5 | 10.3 |
| $Li_2O$ | — | — | — | — | — | — | — |
| $K_2O$ | — | — | 6.7 | 7.4 | 4.9 | 1.0 | 1.2 |
| PbO | — | — | — | — | — | — | 1.5 |
| F | .22 | .22 | .22 | .22 | — | 1.2 | 1.2 |
| Ag | 0.2 | 0.2 | 0.2 | 0.2 | 0.2 | 0.2 | 0.2 |
| Cl | 0.3 | 0.3 | 0.3 | 0.3 | 0.3 | 0.3 | 0.3 |
| Br | 0.15 | 0.15 | 0.15 | 0.15 | 0.15 | 0.15 | 0.15 |
| CuO | 0.02 | 0.02 | 0.02 | 0.02 | 0.02 | 0.02 | 0.02 |
| Strength (MOR-psi) | 34,000 | 46,000 | 32,000 | 33,000 | 33,000 | 51,000 | 50,000 |
| Depth of Compression |  |  |  |  |  |  |  |

TABLE II-continued

|  | A | B | C | D | E | F | G |
|---|---|---|---|---|---|---|---|
| Layer (mils) | 1.4 | 1.4 | 3.5 | 2.5 | 3.0 | 2.0 | 2.0 |

Although lithium oxide in some minimum concentration is required to obtain sheet glass with useful chemical strengthenability characteristics, the hereindescribed maximum concentration limitations for this constituent must also be observed in order to obtain the glass stability required for sheet drawing applications. Moreover, relative freedom from alkaline earth metal oxides and other non-essential oxides such as ZnO, $TiO_2$ and $ZrO_2$ is desirable in order to preserve the stability and resistance to devitrification of the glass. In fact, glasses which are essentially free of CaO, BaO, SrO, MgO, ZnO, $TiO_2$, and $ZrO_2$ are preferred for use in the invention.

Table III below sets forth further glass compositions outside the scope of the present invention which confirm the effects of excessive non-essential oxide concentrations or excessive lithium oxide concentrations on the physical-chemical properties of the resulting glass. The common feature of all of these glasses is insufficient low temperature glass stability, characterized in each case by a liquidus temperature substantially above the $10^5$ poise viscosity temperature of the glass, in most cases above the $10^4$ poise viscosity temperature of the glass. Also, all of these glasses exhibit poor long-term stability in contact with alumina-containing refractories at temperaturess in the forming range. Compositions are set forth in parts by weight on the oxide basis as calculated from the batch, except for silver and the halogens which are reported on an elemental basis. These compositions would not be utilized for continuous sheet drawing processes because the relative instability of the glass would, under normal conditions, eventually lead to devitrification and the formation of crystalline defects or stones in the drawn glass.

TABLE III

|  | H | I | J | K | L | M | N | O | P |
|---|---|---|---|---|---|---|---|---|---|
| $SiO_2$ | 63.3 | 58.6 | 61.4 | 58.5 | 55.5 | 55.9 | 54.5 | 59.1 | 58.6 |
| $B_2O_3$ | 18.0 | 22.1 | 6.7 | 4.7 | 16.1 | 16.2 | 16.2 | 17.2 | 17.0 |
| $Al_2O_3$ | 9.4 | 9.7 | 15.3 | 18.9 | 8.9 | 9.0 | 10.6 | 11.5 | 11.4 |
| $Na_2O$ | 4.9 | 5.0 | 8.4 | 10.0 | 1.8 | 1.9 | 1.9 | 5.8 | 5.8 |
| $Li_2O$ | 4.3 | 4.5 | — | — | 2.6 | 2.7 | 2.7 | 2.0 | 1.9 |
| $K_2O$ | — | — | 3.3 | 3.2 | — | — | — | — | — |
| PbO | — | — | 0.5 | 0.5 | 5.0 | 5.7 | 5.4 | 2.3 | 2.3 |
| MgO | — | — | 2.9 | 2.8 | — | — | — | 2.1 | — |
| BaO | — | — | — | — | 6.6 | 8.3 | 8.4 | — | — |
| $ZrO_2$ | — | — | — | — | 2.2 | — | — | — | — |
| CaO | — | — | — | — | — | — | — | — | 2.9 |
| F | .22 | .22 | .22 | .22 | .22 | .22 | .22 | .22 | .22 |
| Ag | 0.2 | 0.2 | 0.2 | 0.2 | 0.2 | 0.2 | 0.2 | 0.2 | 0.2 |
| Cl | 0.3 | 0.3 | 0.3 | 0.3 | 0.3 | 0.3 | 0.3 | 0.3 | 0.3 |
| Br | 0.15 | 0.15 | 0.15 | 0.15 | 0.15 | 0.15 | 0.15 | 0.15 | 0.15 |
| CuO | 0.02 | 0.02 | 0.02 | 0.02 | 0.02 | 0.02 | 0.02 | 0.02 | 0.02 |

The photochromic properties of the drawn sheet are of course affected within limits by the thermal treatment utilized to develop these properties in the glass. However, these properties are also critically dependent on the composition of the glass. Compositional variations affecting these properties include not only variations in the concentrations of the photochromic constituents silver, the halogens, and copper oxide, but also variations in alkali metal oxide, silica, and $B_2O_3$, and PbO concentrations.

Table IV below sets forth further examples of glass compositions outside the scope of the present invention which exhibit insufficient photochromic darkening or poor fading characteristics attributable to compositional variations beyond the limitations herein described. The concentrations of the glass constituents are set forth in parts by weight on the oxide basis as calculated from the bath for each glass, except for silver and the halogens which are reported on an elemental basis. The observed insufficiencies in photochromic behavior noted for each glass are also reported, and are with reference to the specific darkening and fading requirements hereinabove set forth.

TABLE IV

|  | Q | R | S | T | U |
|---|---|---|---|---|---|
| $SiO_2$ | 58.4 | 55.2 | 67.8 | 63.0 | 51.2 |
| $B_2O_3$ | 17.3 | 16.1 | 14.1 | 18.4 | 20.0 |
| $Al_2O_3$ | 11.3 | 10.5 | 9.3 | 12.0 | 13.0 |
| $Na_2O$ | 8.8 | 13.9 | 4.6 | 3.2 | 10.2 |
| $Li_2O$ | 1.9 | 2.4 | 2.4 | 2.1 | 2.3 |
| PbO | 2.2 | 2.0 | 1.8 | 2.3 | 2.5 |
| F | .22 | .20 | .22 | .22 | .22 |
| Ag | .1 | .20 | .20 | .20 | .20 |
| Cl | .1 | .30 | .30 | .30 | .30 |
| Br | .05 | .15 | .15 | .15 | .15 |
| CuO | .005 | .02 | .02 | .02 | .02 |
| Photochromic Properties | poor darkening, fading | poor fading | poor darkening | poor darkening | poor fading |

The optional addition of the above-described transition and rare earth metal oxide colorants to the glass compositions of the present invention is useful to provide some light attenuation and coloration in the faded state, usually for cosmetic purposes, and also to provide some coloration and attenuation in the darkened state. However, care must be exercised in the selection of colorants to be incorporated into photochromic glasses because the effectiveness of some multivalent colorants depends strongly upon the oxidation state of the glass, and because some colorants absorb in the ultraviolet and thus reduce the darkening capabilities of the glass. For these reasons, the foregoing transition metal and rare earth metal oxide colorants are preferred. However, minor quantities of additional colloidal or ionic colorants such as uranium, cadmium sulfide, cadmium sulfide, cadmium selenide, metallic gold or the like can be added provided such additions do not detrimentally affect the photochromic properties of the glass.

Table V below sets forth examples of tinted glass compositions provided in accordance with the invention, illustrating the use of some of the preferred colorants and the colors induced thereby in the compositions of the invention. Only the concentrations of the colorants, in parts by weight, are set forth, the remainder of each glass consisting of 59.2 parts $SiO_2$, 17.2 parts $B_2O_3$, 11.6 parts $Al_2O_3$, 8.7 parts $Na_2O$, 1.5 parts $Li_2O$, 2.3 parts PbO and minor concentrations of photochromic constituents by weight.

stable for use in combination with alumina or alumina-containing refractories. Hence glass compositions which are particularly preferred in accordance with the present invention are those exhibiting long-term stability, as hereinabove defined, even in contact with alumina-containing refractories at glass viscosities in the $10^4$–$10^6$ poise range. Such glass compositions consist essentially, in weight percent on the oxide basis as calculated from the batch, of about 57.1–65.3% $SiO_2$, 9.6–13.9% $Al_2O_3$, 12.0–22.0% $B_2O_3$, 1.0–3.5% $Li_2O$, 3.7–12.0% $Na_2O$, 0–5.8% $K_2O$, 6–15% $Li_2O + Na_2O + K_2O$, a ratio of $Li_2O$ content to $Na_2O + K_2O$ content not exceeding about 1:3, 0.7–3.0% PbO, 0.1–1.0% Ag, 0.15–1.0% Cl, 0–3.0% Br, 0–2.5% F, 0.008–0.12% CuO, 0–1.0% total of transition metal oxide colorants selected in the indicated proportion from the group consisting of 0–0.5% CoO, 0–1.0% NiO, and 0–1.0% $Cr_2O_3$, and 0–5.0% total of rare earth metal oxide colorants selected from the group consisting of $Er_2O_3$, $Pr_2O_3$, $Ho_2O_3$ and $Nd_2O_3$. Glasses within the broad scope of the present invention but outside these defined limitations are not sufficiently stable with time for use with alumina-containing overflow downdraw forming members of the kind described above.

Examples of glasses suitable for use in combination with alumina-containing refractory downdraw fusion pipes or troughs in the production of photochromic drawn sheet glass articles in accordance with the inven-

TABLE V

| | 7 | 8 | 9 | 10 | 11 | 12 | 13 | 14 | 15 |
|---|---|---|---|---|---|---|---|---|---|
| CoO | 0.03 | 0.04 | 0.02 | 0.01 | — | — | — | — | — |
| NiO | 0.04 | 0.03 | 0.11 | 0.15 | 0.17 | — | — | — | — |
| $Cr_2O_3$ | — | — | — | — | — | 0.01 | — | — | — |
| $Er_2O_3$ | — | — | — | — | — | — | 0.5 | — | — |
| $Pr_2O_3$ | — | — | — | — | — | — | — | 0.5 | — |
| $Nd_2O_3$ | — | — | — | — | — | — | — | — | 0.5 |
| Tint | blue-gray | blue | green-brown | brown | yellow-brown | green | light pink | light green | light blue |

The highest quality drawn glass sheet produced from glass compositions provided in accordance with the present invention is obtained utilizing downdraw sheet forming apparatus such as described in U.S. Pat. No. 3,338,696 to Dockerty. The use of apparatus of this type, particularly in combination with the sheet thickness control means and methods described in U.S. Pat. No. 3,682,609 to Dockerty, permits the production of glass sheet of optical quality and uniform thickness which is especially suited to the production of photochromic drawn sheet glass articles, such as sunglass lenses, having the properties hereinabove described.

However, these processes also place the highest demands on the physical-chemical properties of the glass because of the extreme glass stability required for successful drawing in accordance with these methods. Stability is particularly critical where the downdraw forming member, referred to as a fusion pipe or trough, is composed of an alumina-containing refractory ceramic such as sillimanite or dense alumina.

Glasses within the preferred compositional limitations hereinabove set forth, such as the glass compositions shown in Table I, exhibit long-term stability against platinum but in some cases are not sufficiently tion are set forth in Table VI below. The compositions of the glasses are reported in parts by weight on the oxide basis as calculated from the batch except for silver and the halogens which are conventionally reported on an elemental basis. All of the glasses set forth in Table VI exhibit long-term stability against devitrification in contact with alumina-containing refractories at glass viscosities in the $10^4$–$10^6$ poise range, as evidenced in each case by a crystallization layer less than 10 microns in depth at a glass-refractory interface even after 30 days at a temperature corresponding to the $10^5$ poise viscosity temperature of the glass.

Also shown in Table VI are the modulus of rupture strengths and compression layer depths observed after ion-exchange strengthening of the glasses when determined on individual samples, these properties being produced by a 16-hour treatment in a molten salt bath of 60% $NaNO_3$ and 40% $KNO_3$ at 390° C.

Also shown in Table VI are the photochromic properties of the glasses, including the clear luminous transmittance ($Y_o$), the darkened luminous transmittance ($Y_D$), and the faded luminous transmittancce ($Y_{F5}$), obtained according to the procedures utilized in generating the data set forth in Table I.

TABLE VI

| | 16 | 17 | 18 | 19 | 20 | 21 | 22 |
|---|---|---|---|---|---|---|---|
| $SiO_2$ | 59.9 | 59.5 | 59.5 | 59.2 | 58.6 | 58.0 | 58.8 |
| $B_2O_3$ | 17.4 | 17.6 | 17.3 | 17.2 | 17.0 | 16.9 | 17.2 |
| $Al_2O_3$ | 11.7 | 11.6 | 11.7 | 11.6 | 11.4 | 11.3 | 11.4 |

TABLE VI-continued

|  | 16 | 17 | 18 | 19 | 20 | 21 | 22 |
|---|---|---|---|---|---|---|---|
| $Na_2O$ | 6.7 | 7.7 | 7.7 | 8.7 | 9.5 | 3.8 | 6.4 |
| $Li_2O$ | 2.0 | 2.0 | 1.5 | 1.5 | 1.1 | 1.8 | 1.9 |
| $K_2O$ | — | — | — | — | — | 5.8 | 2.0 |
| PbO | 2.3 | 2.2 | 2.3 | 2.3 | 2.3 | 2.3 | 2.3 |
| F | .27 | .22 | .20 | .20 | .27 | .27 | .27 |
| Ag | .25 | .23 | .25 | .25 | .25 | .24 | .24 |
| Cl | .30 | .37 | .30 | .30 | .30 | .30 | .30 |
| Br | .26 | .15 | .26 | .26 | .26 | .26 | .26 |
| CuO | .018 | .025 | .014 | .014 | .018 | .018 | .018 |
| CoO | .014 | .026 | .014 | .014 | .014 | — | .014 |
| NiO | .13 | .041 | .13 | .13 | .13 | — | .13 |
| $Y_o$ | 73.1 | 74.5 | 73.4 | 73.0 | 70.4 | 90.0 | 71.5 |
| $Y_D$ | 19.1 | 22.0 | 22.2 | 23.1 | 18.5 | 24.8 | 15.0 |
| $Y_{F5}$ | 34.2 | 38.0 | 39.8 | 40.2 | 30.5 | 40.6 | 25.1 |
| Strength (MOR-psi) | — | 50,800 | 59,100 | 47,800 | 52,100 | 50,200 | 53,900 |
| Depth of Compression Layer (mils) | — | 5.3 | 3.8 | 4.3 | 4.0 | 3.5 | 4.2 |

The invention may be further understood from the following illustrative example describing the production of strengthened photochromic drawn sheet glass articles in accordance therewith.

EXAMPLE

A glass batch is compounded and melted in a batch melter at a temperature on the order of about 1400° C. to provide a molten glass having a composition, in parts by weight as calculated from the bath, of about 58.1 parts $SiO_2$, 16.9 parts $B_2O_3$, 11.3 parts $Al_2O_3$, 3.8 parts $Na_2O$, 5.8 parts $K_2O$, 1.8 parts $Li_2O$, 0.24 parts Ag, 0.30 parts Cl, 0.26 parts Br, 0.27 parts F, and 0.018 parts $C_{40}$ by weight.

The molten glass is fed into a refractory overflow downdraw fusion pipe at a viscosity of about $10^4$ poises and is delivered from the pipe as drawn glass sheet about 1.5 millimeters in thickness. This drawn sheet is cooled below the glass softening temperature and separated into sections of glass sheet from which small samples of drawn sheet glass are cut.

The drawn sheet glass articles prepared as described are then subjected to a heat treatment to develop the photochromic properties thereof. The heat treatment comprises heating the articles in a lehr, supporting the article in a manner to prevent surface damage, at a rate of about 600° C. per hour to a temperature of 630° C., holding the articles at this temperature for ½ hour, cooling the articles at a rate of about 600° C. to a temperature at least below 350° C. per hour, and finally removing the articles from the lehr.

The photochromic drawn sheet glass articles prepared as described are then subjected to an ion-exchange strengthening treatment comprising immersion in a molten $NaNO_3$ bath at a temperature of 390° C. for 16 hours. After treatment the samples are removed from the salt bath, cooled, washed to remove excess salt, and tested for strength and photochromic properties. The unabraded modulus of rupture strengths of the articles averages about 50,200 psi with depths of surface compression being about 3.5 mils.

The faded luminous transmittance (Y) of a typical 1.5 mm thick photochromic drawn sheet glass article produced as above described is about 90.9%. When darkened by a 20-minute exposure to a pair of 15 watt black-light blue fluorescent UV lamp bulbs spaced a distance of about 3¾ inches from the glass sheet, a darkened luminous transmittance of about 22.8% is obtained. The darkened glass typically fades about 15.6 percentage points to a luminous transmittance of about 38.4% in a 5-minute fading interval.

From the foregoing example, which is merely illustrative of the various compositions and procedures which may be employed in accordance with the present invention, the effectiveness of our compositions in providing strengthened photochromic drawn sheet glass articles exhibiting the required properties for optical and other applications is readily apparent.

We claim:

1. A chemically-strengthened photochromic drawn sheet glass article formed of a glass having a composition consisting essentially, in weight percent as calculated from the batch, of about 54–66% $SiO_2$, 7–15% $Al_2O_3$, 10–25% $B_2O_3$, 0.5–4.0% $Li_2O$, 3.5–15% $Na_2O$, 0–10% $K_2O$, 6–16% total of $Li_2O + Na_2O + K_2O$, 0–3.0% PbO, 0.1–1.0% Ag, 0.1–1.0% Cl, 0–3.0% Br, 0–2.5% F, 0.008–0.16% CuO, 0–1.0% total of transition metal oxide colorants, and 0–5.0% total of rare earth metal oxide colorants, said composition providing a glass having a viscosity at the liquidus temperature thereof of at least about $10^4$ poises, said article having excellent chemical durability, an unabraded modulus of rupture strength of at least about 45,000 psi, and a compressively-stressed surface layer at least about 3.5 mils in thickness, and said glass being haze-free and having, in a thickness not exceeding 1.7 millimeters, a darkened luminous transmittance not exceeding about 25%, a clear luminous transmittance of at least about 60%, and a fading rate such that the glass exhibits a faded luminous transmittance at least about 1.5 times the darkened luminous transmittance after a 5-minute fading interval from the darkened state.

2. A photochromic drawn sheet glass article according to claim 1 having a thickness in the range of about 1.3–1.7 millimeters.

3. A photochromic drawn sheet glass article according to claim 2 having a clear luminous transmittance in the range of about 60–92%.

4. A photochromic drawn sheet glass article according to claim 3 which is an optical lens.

5. A photochromic drawn sheet glass article according to claim 4 having a composition consisting essentially, in weight percent as calculated from the batch, of about 57.1–65.3% $SiO_2$, 9.6–13.9% $Al_2O_3$, 12.0–22.0% $B_2O_3$, 1.0–3.5% $Li_2O$, 3.7–12.0% $Na_2O$, 0–5.8% $K_2O$, 6–15% total of $Li_2O + Na_2O + K_2O$, a ratio of $Li_2O$ content to $Na_2O + K_2O$ content not exceeding about 2:3, 0.7–3.0% PbO, 0.1–1.0% Ag, 0.15–1.0% Cl, 0–3.0% Br, 0–2.5% F, 0.008–0.12% CuO, 0–1.0% total of transition metal oxide colorants selected in the indicated proportion from the group consisting of 0–0.5% CoO, 0–1.0% NiO and 0–1.0% $Cr_2O_3$, and 0–5.0% total of rare earth metal oxide colorants selected from the group consisting of $Er_2O_3$, $Pr_2O_3$, $Ho_2O_3$ and $Nd_2O_3$, said composition providing a glass having a viscosity at the liquidus temperature thereof of at least about $10^5$ poises.

6. A photochromic sheet glass article according to claim 5 wherein the ratio of the $Li_2O$ content to the $Na_2O + K_2O$ content does not exceed about 1:3.

7. A photochromic drawn sheet glass article according to claim 5 having a thickness in the range of about 1.3–1.7 millimeters.

8. A photochromic drawn sheet glass article according to claim 7 which is an optical lens.

9. A photochromic drawn sheet glass article according to claim 8 which has a clear luminous transmittance in the range of about 60–92%.

* * * * *

UNITED STATES PATENT AND TRADEMARK OFFICE
CERTIFICATE OF CORRECTION

PATENT NO. : 4,018,965
DATED : April 19, 1977
INVENTOR(S) : David J. Kerko and Thomas P. Seward, III It is certified that error appears in the above-identified patent and that said Letters Patent are hereby corrected as shown below:

Column 3, line 48, "54-60% $SiO_2$," should be -- 54-66% $SiO_2$, --.

Column 6, line 5, "increases" should be -- increase --.

Column 6, line 59, "with" should be -- within --.

Column 6, line 62, "12.02-22.0%" should be -- 12.0-22.0% --.

Column 7, line 2, "0.1% NiO, and 0-0% $Cr_2O_3$," should be -- 0-1.0% NiO, and 0-1.0% $Cr_2O_3$, --.

Column 8, line 8, "approximately" should be -- approximate --.

Column 10, line 37, delete "and".

Column 13, line 33, "$C_{4O}$" should be -- CuO --.

Column 14, line 61, Claim 5, "4" should be -- 1 --.

Signed and Sealed this thirtieth Day of August 1977

[SEAL]

Attest:

RUTH C. MASON
Attesting Officer

C. MARSHALL DANN
Commissioner of Patents and Trademarks